United States Patent
Wen

(10) Patent No.: US 9,298,313 B2
(45) Date of Patent: Mar. 29, 2016

(54) IN-CELL CAPACITIVE TOUCH SCREEN AND TOUCH CONTACT DETECTING METHOD AND SYSTEM THEREOF

(71) Applicant: Shanghai Tianma Micro-Electronics Co., Ltd., Shanghai (CN)

(72) Inventor: Lin Wen, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 133 days.

(21) Appl. No.: 14/067,582

(22) Filed: Oct. 30, 2013

(65) Prior Publication Data

US 2014/0085262 A1    Mar. 27, 2014

Related U.S. Application Data

(63) Continuation of application No. PCT/CN2012/084265, filed on Nov. 8, 2012.

(30) Foreign Application Priority Data

Sep. 24, 2012   (CN) .......................... 2012 1 0359837

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ........ G06F 3/044; G06F 3/0418; G06F 3/041
See application file for complete search history.

(56) References Cited

U.S. PATENT DOCUMENTS

2010/0295824 A1* 11/2010 Noguchi et al. .............. 345/175

FOREIGN PATENT DOCUMENTS

| CN | 101271211 A | 9/2008 |
| CN | 101893957 A | 11/2010 |

* cited by examiner

*Primary Examiner* — Alexander Eisen
*Assistant Examiner* — Cory Almeida
(74) *Attorney, Agent, or Firm* — Alston & Bird LLP

(57) ABSTRACT

A method and system for detecting at ouch contact on an in-cell capacitive touch screen includes, based on the different gray scale pictures displayed by the in-cell capacitive touch screen in a non-touch state as well as a distribution of the intersections of rows and columns of the in-cell capacitive touch screen, obtaining noise values corresponding to different gray scales for each intersection, obtaining a theoretical noise value for each intersection under a condition of a current picture, and, for each intersection, compensating a detected signal with the theoretical noise value in the current picture to locate a position of the touch contact.

14 Claims, 3 Drawing Sheets

IN-CELL CAPACITIVE TOUCH SCREEN AND TOUCH CONTACT DETECTING METHOD AND SYSTEM THEREOF

CROSS-REFERENCES TO RELATED APPLICATIONS

This application claims priority to and is a continuation of PCT/CN2012/084265, filed on Nov. 8, 2012 and entitled "IN-CELL CAPACITIVE TOUCH SCREEN AND TOUCH CONTACT DETECTING METHOD AND SYSTEM THEREOF", which application claims the benefit of Chinese Patent Application No. 201210359837.6, filed with the Chinese Patent Office on Sep. 24, 2012 and entitled "IN-CELL CAPACITIVE TOUCH SCREEN AND TOUCH CONTACT DETECTING METHOD AND SYSTEM THEREOF", the contents of which are incorporated herein by reference in their entirety.

TECHNICAL FIELD

The present invention relates to the field of touch screens, in particular to a method and system for detecting a touch contact on an in-cell capacitive touch screen, and the in-cell capacitive touch screen.

BACKGROUND OF THE INVENTION

Touch technology provides people with a more humanized operation manner of human-computer interaction, and has gradually grown as a dominant manipulation technique. Touch screen technologies, which were invented in the 1970s and have been developed for over 40 years, generally include four categories depending on the type of the used sensor, that is, a capacitive touch screen, a resistive touch screen, an infrared touch screen, and an acoustic wave touch screen, among which, the capacitive touch screen has the largest market share of the touch screen field due to its advantages such as multi-touch, accurate positioning, and long lifetime. Most of the present capacitive touch screens are of an on-cell structure, in which the touch panel and the display panel are two independent devices directly superimposed on each other for assembly. Such a manner that the touch panel is directly attached onto the display panel inevitably adds the thickness and weight of the touch panel to the display unit, and thus does not meet the requirements of lighter and thinner display devices in the present market. Furthermore, the touch panel has relatively numerous layers and thus decreases light transmittance, thereby adversely affecting a display effect of the display device.

The in-cell capacitive touch screen is such that various film layers are made between the upper and lower glass substrates so that a touch layer is embedded in the color filter substrate, thus one glass substrate can be saved compared with the externally-attached structure, and an additional protection layer for protecting sensing units of the capacitive touch screen is not required. Therefore, the light transmittance and the display effect of the screen are greatly improved while reducing manufacturing process steps and costs, the manufacturing process is relatively simple and suitable for mass production, and the capacitive touch screen display is made lighter and thinner and satisfies requirements for portability and lightweight of the handheld device.

As shown in FIG. 1, an in-cell capacitive touch screen in the prior art generally includes: a Thin Film Transistor (TFT) substrate 101, as well as a circuit electrode 101a, a liquid crystal layer (not shown), a color filter (CF) substrate 102, a black matrix (not shown), a touch layer 103, a color resistance layer (not shown), and an insulating layer 104 located on the TFT substrate 101. Drive lines and sense lines, which are arranged across with each other, are arranged on the touch layer 103.

As shown in FIG. 2, a touch signal is generated when a finger touches an intersection of a drive line with a sense line. The detection principle of the screen includes: applying driving signals on the drive lines, and detecting a signal change on the sense lines. Assuming that the drive lines are used to determine X-direction coordinates and the sense lines are used to determine Y-direction coordinates, in the process of the detection, the drive lines in the X direction are progressively scanned, and the signal on each sense line is read in scanning each drive line, thus, each of intersections of all the sense lines with all the drive lines can be traversed within a cycle of scanning, so as to determine the intersection on which a touch action is performed.

FIG. 3 shows an equivalent circuit diagram at the intersection of the drive line and the sense line, a mutual capacitor C is equivalently coupled at each intersection and has a capacitance which is the sum of a facing capacitance formed at the overlap between the drive line and the sense line and an edge capacitance formed by the patterned edges on the sense line and the drive line; a resistor Rt denotes the equivalent resistor of the drive line, a resistor Rr denotes the equivalent resistor of the sense line; a parasitic capacitor Ct is formed on the drive line and a parasitic capacitor Cr is formed on the sense line; an excitation source is used to generate the driving signal Vin; and the touch detection circuit is an amplifier, which is configured to convert the electrical signal on the sense line into a voltage signal Vout for outputting. When a finger touches the screen, the finger functions as a bridge between the drive line and the sense line at the touch contact, which is equivalent to connect a further capacitor in parallel with the mutual capacitor C, causing the capacitance of the mutual capacitor C to increase, leading to a change of the electrical signal on the sense line, and thus generating a change in the output voltage Vout. In conjunction with FIG. 3, during the operation of the in-cell capacitive touch screen, a liquid crystal is rotated by a different angle for displaying different gray scale pictures, thus the liquid crystal capacitor Clc has a different capacitance, which leads to a different change in the output voltage Vout. Therefore, the noise generated by the rotation of the liquid crystals likely interferes and impacts the touch sensing signal in the touch layer, thus causing an inaccurate touch contact detection, which may cause a malfunction of the touch screen.

BRIEF SUMMARY OF THE INVENTION

An object of the present invention is to provide a method and system for detecting a touch contact on an in-cell capacitive touch screen, and the in-cell capacitive touch screen itself, which can compensate in real time for noise interference caused by the liquid crystal capacitances in displaying pictures, and accurately detect a touch contact, thus reducing the impact of picture displaying on the touch.

Embodiments of the present invention provide a method for detecting a touch contact on an in-cell capacitive touch screen. The method includes:

based on different gray scale pictures displayed by the in-cell capacitive touch screen in a non-touch state as well as the distribution of intersections of all rows and all columns of the in-cell capacitive touch screen, obtaining noise values corresponding to different gray scales for each of the intersections in a non-touch state;

based on the current picture displayed by the in-cell capacitive touch screen and the obtained noise values corresponding to the different gray scales for each intersection in the non-touch state, obtaining a theoretical noise value for each intersection under the condition of the current picture; and for each of the intersections of all rows and all columns of the in-cell capacitive touch screen, compensating a detected signal at each intersection with the theoretical noise value for the intersection under the condition of the current picture, so as to position the location of the touch contact.

Embodiments of the present invention also provide a system for detecting a touch contact on an in-cell capacitive touch screen. The system includes:

a storage module, which is configured to store noise values corresponding to different gray scales for each intersection of the in-cell capacitive touch screen in a non-touch state;

a theoretical noise calculation module, which is configured to obtain a theoretical noise value for each intersection under the condition of the current picture, based on the current picture displayed by the in-cell capacitive touch screen as well as the noise values corresponding to the different gray scales for each intersection in the non-touch state; and a touch contact detection module, which is configured to obtain a detected signal at each of the intersections of all rows and all columns of the in-cell capacitive touch screen, and compensate the detected signal at each intersection with the theoretical noise value for each intersection under the condition of the current picture, so as to position the location of the touch contact.

The present invention also provides an in-cell capacitive touch screen, which includes the above system for detecting the touch contact on the in-cell capacitive touch screen.

Compared with the prior art, with the in-cell capacitive touch screen as well as the method and system for detecting the touch contact thereon as provided by the present invention, based on the different gray scale pictures displayed by the in-cell capacitive touch screen in a non-touch state as well as the distribution of the intersections of all rows and all columns of the in-cell capacitive touch screen, the noise values corresponding to the different gray scales for each intersection in a non-touch state are obtained; then, the theoretical noise value for each intersection under the condition of the current picture is obtained; next, for each of the intersections of all rows and all columns of the in-cell capacitive touch screen, the detected signal is compensated with the theoretical noise value in current picture, so as to position the location of the touch contact. Therefore, with the in-cell capacitive touch screen as well as the method and system for detecting the touch contact thereon as provided by the present invention, it is possible to compensate in real time for the noise interference caused by the liquid crystal capacitance in displaying picture, and accurately detect the touch contact, thus reducing the impact of the touch displaying on the picture.

DETAILED DESCRIPTION OF THE INVENTION

Embodiments of the present invention will be described in detail below with reference to the drawings for a better understanding of objects and features of the present invention. However, the present invention can be implemented in different manners and should not be considered to be limited to the described embodiments.

Figure 1:
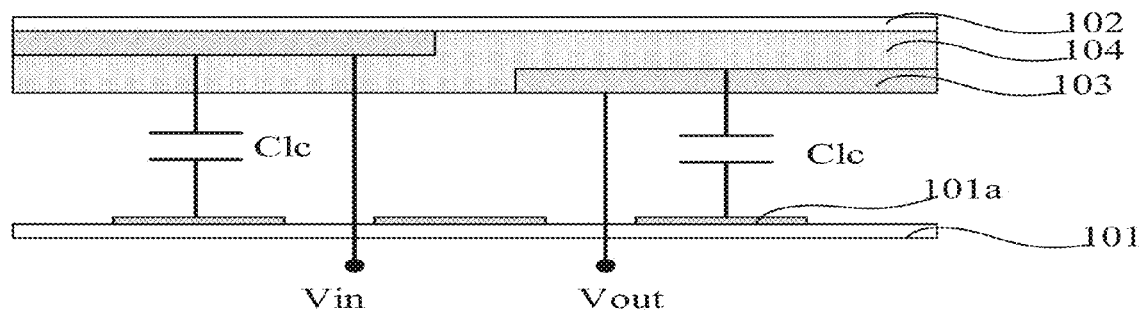
FIG. 1 is a schematic diagram showing the cross-sectional view of an in-cell capacitive touch screen structure in the prior art.
Figure 2:
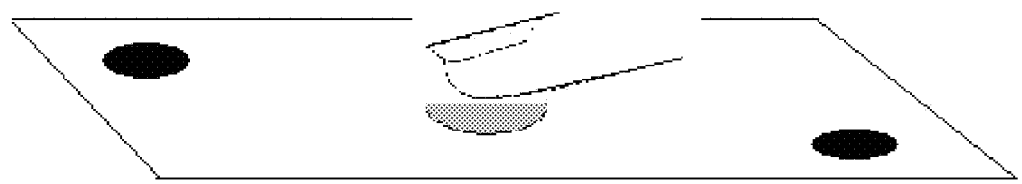
FIG. 2 is a schematic diagram showing a touch detection of the in-cell capacitive touch screen shown in FIG. 1.
Figure 3:
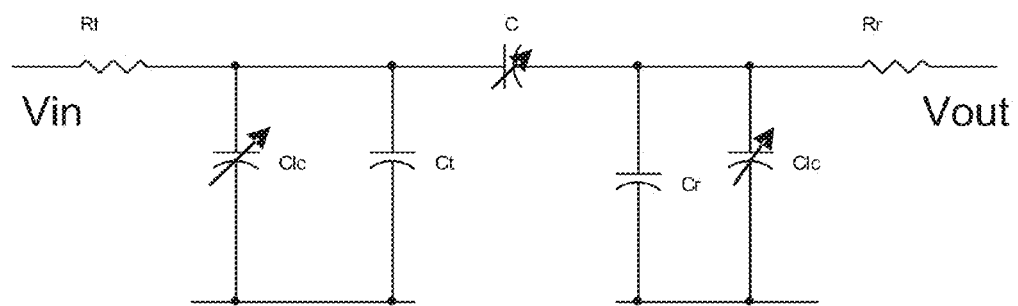
FIG. 3 is a diagram showing the detection principle of the in-cell capacitive touch screen of FIG. 2.
Figures 4, 5:
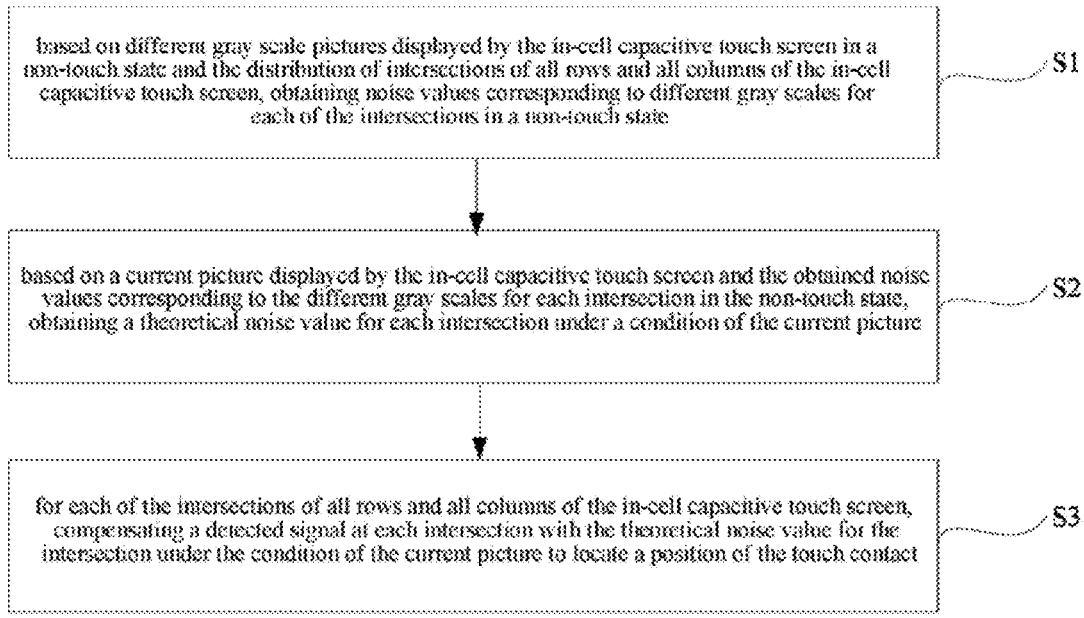
FIG. 4 is a flowchart showing a method for detecting a touch contact on an in-cell capacitive touch screen according to an embodiment of the present invention.
FIG. 5 is a table of gray scales versus noise values of the in-cell capacitive touch screen according to an embodiment of the present invention.

FIG. 4 is a flowchart diagram illustrating a method for detecting a touch contact on an in-cell capacitive touch screen according to an embodiment of the present invention. The method includes:

a step S1, based on different gray scale pictures displayed by the in-cell capacitive touch screen in a non-touch state and the distribution of intersections of all rows and all columns of the in-cell capacitive touch screen, obtaining noise values corresponding to different gray scales for each of the intersections in a non-touch state;

a step S2, based on a current picture displayed by the in-cell capacitive touch screen and the obtained noise values corresponding to the different gray scales for each intersection in the non-touch state, obtaining a theoretical noise value for each intersection under a condition of the current picture; and a step S3, for each of the intersections of all rows and all columns of the in-cell capacitive touch screen, compensating a detected signal at each intersection with the theoretical noise value for the intersection under the condition of the current picture to locate a position of the touch contact.

In step S1, the detected signals present when the in-cell capacitive touch screen displays the respective gray scale pictures are actually measured and simulated, in order to obtain the noise values corresponding to the different gray scale pictures for each intersection in the non-touch state. That is, with the actual measurement or simulation, in the non-touch state when the in-cell capacitive touch screen displays the different gray scale pictures, the signal at each of the intersections in the in-cell capacitive touch screen is detected, in order to obtain the noise values corresponding to the different gray scale pictures for each intersection in the non-touch state. Further, the obtained noise values corresponding to the different gray scales for each intersection in the non-touch state form a table. In the non-touch state, the number of the different gray scale pictures displayed by the in-cell capacitive touch screen may be 256, or any another number such as 16, 32, 64, and 128. In the non-touch state, when the number of the different gray scale pictures displayed by the in-cell capacitive touch screen is 256, each of the different gray scale pictures has a gray scale which is one of the gray scales in the range of 0-255; when the number of the different gray scale pictures displayed by the in-cell capacitive touch screen is 32, each of the different gray scale pictures has a gray scale which is one of the gray scales in the range of 0-31; when the number of the different gray scale pictures displayed by the in-cell capacitive touch screen is 64, each of the different gray scale pictures has a gray scale which is one of the gray scales in the range of 0-63; when the number of the different gray scale pictures displayed by the in-cell capacitive touch screen is 128, each of the different gray scale pictures has a gray scale which is one of the gray scales in the range of 0-127; when the number of the different gray scale pictures displayed by the in-cell capacitive touch screen is 16, each of the different gray scale pictures has a gray scale which is one of the gray scales in the range of 0-15. In the present embodiment, in the non-touch state, the different gray scale pictures displayed by the in-cell capacitive touch screen amount to 256, and each of the different gray scale pictures has a gray scale which is one of gray scales 0-255, that is, signals are detected for the gray scale pictures respectively having gray scales 0-255 with respect to the in-cell capacitive touch screen having a 800×480 resolution in the absence of a touch, in order to obtain the table of noise values corresponding to different gray scales for each intersection of the in-cell capacitive touch screen in the non-touch state.

FIG. 5 shows the noise values for the different intersections of the rows and columns of the in-cell capacitive touch screen under the gray scales 0 and 255. For example, under the gray scale 255, the noise value for the intersection with a horizontal coordinate of 10 and a vertical coordinate of 9 is −4 in the non-touch state, that is, the noise value for the intersection of the 9-th row and the 10-th column is −4 in the non-touch state under the gray scale 255.

The step of obtaining a theoretical noise value for each intersection under the condition of the current picture in step S2 includes:

determining the current gray scale at each intersection based on the current picture displayed by the in-cell capacitive touch screen;

determining the noise value corresponding to the current gray scale for each intersection in a non-touch state, based on the noise values corresponding to the different gray scales for each intersection in a non-touch state; for example, if an intersection in the current calculation has the gray scale 255, the noise value corresponding to the gray scale 255 for the intersection in the current calculation in a non-touch state can be easily determined by searching the table shown in FIG. 5, and is used in the following calculation; and calculating, based on the noise value corresponding to the current gray scale for an intersection in the non-touch state and the noise values corresponding to the current gray scale for other intersections in the non-touch state which are in the same row and/or column with that intersection, the theoretical noise value for each of the intersections of all rows and all columns of the in-cell capacitive touch screen under the condition of the current picture.

Figure 6:
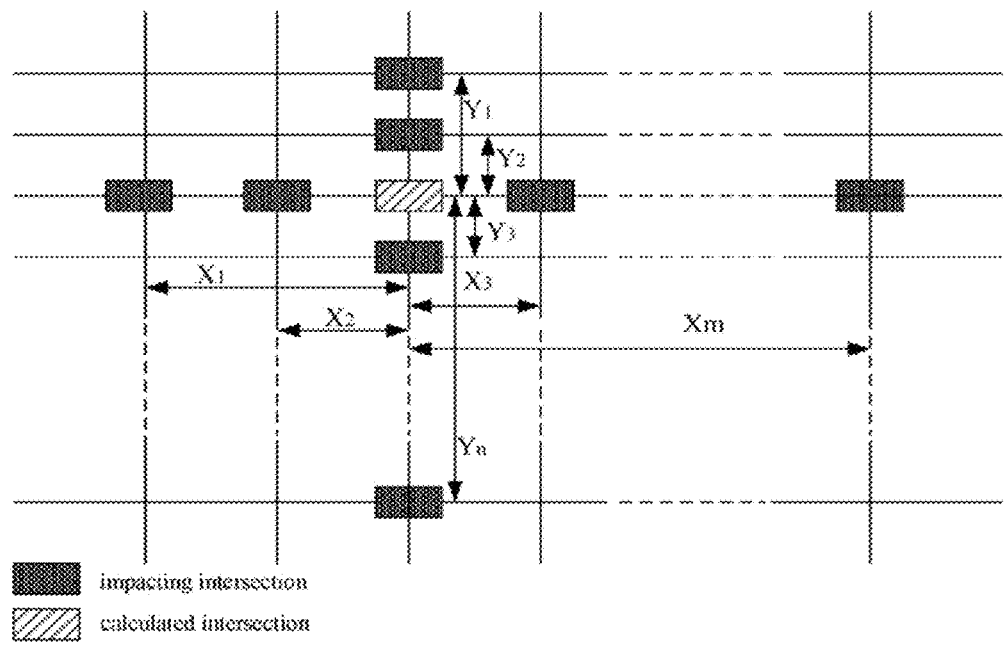
FIG. 6 is a diagram showing the principle for calculating the theoretical noises of the in-cell capacitive touch screen according to an embodiment of the present invention.

FIG. 6 is a diagram illustrating the principle of calculating theoretical noises of an in-cell capacitive touch screen according to an embodiment of the present invention. In calculating the theoretical value for noise caused by the liquid crystal capacitance for each intersection, the impact of surrounding intersections on the calculated intersection is taken into account to improve the accuracy of the theoretical noise value for the calculated intersection. Thus, the theoretical noise value for each intersection is calculated by an equation below:

$$N=N_0+\Sigma_1^J N_m/(1+X_m/X)+\Sigma_1^K N_n/(1+Y_n/Y) \quad \text{(Equation 1)}$$

where, N denotes the theoretical noise value corresponding to the current gray scale for the calculated intersection; $N_0$ denotes the noise value corresponding to the current gray scale for the calculated intersection in the non-touch state; X denotes the length in the row direction of a picture block of the current gray scale displayed at the calculated intersection in the current display picture; Y denotes the length in the column direction of the picture block of the current gray scale displayed at the calculated intersection in the current display picture; J and K represent the total number of intersections which have an impact on and are in the same row with the calculated intersection and the total number of intersections which have an impact on and are in the same column with the calculated intersection, respectively; $X_m$ denotes the distance between the calculated intersection and the m-th impacting intersection in the same row with the calculated intersection; $N_m$ denotes the noise value corresponding to the current gray scale for the m-th impacting intersection in the non-touch state; $Y_n$ denotes the distance between the calculated intersection and the n-th impacting intersection in the same column with the calculated intersection; $N_n$ denotes the noise value corresponding to the current gray scale for the n-th impacting intersection in the non-touch state; and J and K each are no less than 2 and are set generally based on the display resolution of the in-cell capacitive touch screen.

For example, if the horizontal coordinate and the vertical coordinate of the calculated intersection are 10 and 9, respectively, and the current gray scale of the calculated intersection is 255, the gray noise value $N_0$ corresponding to the current gray scale for the calculated intersection in the non-touch state may be known as −4 by searching the table shown in FIG. 5. X denotes the length in the row direction of the picture block of the current gray scale displayed at the calculated intersection in the current display picture; and Y denotes the length in the column direction of the picture block of the current gray scale displayed at the calculated intersection in the current display picture. As for a determined touch screen, both X and Y have determined fixed values. J and K represent the total number of intersections which have an impact on and are in the same row with the calculated intersection and the total number of intersections which have an impact on and are in the same column with the calculated intersection, respectively. Generally, J and K are set based on the display resolution of the in-cell capacitive touch screen. $X_m$ denotes the distance between the calculated intersection and the m-th impacting intersection in the same row with the calculated intersection, and $Y_n$ denotes the distance between the calculated intersection and the n-th impacting intersection in the same column with the calculated intersection. As for a determined touch screen, both $X_m$ and $Y_n$ are determined fixed values. $N_m$ denotes the noise value corresponding to the current gray scale for the m-th impacting intersection in the non-touch state, and $N_n$ denotes the noise value corresponding to the current gray scale for the n-th impacting intersection in the non-touch state. Since the horizontal coordinate and the vertical coordinate of any intersection (i.e. the sequence numbers of the row and column in which the intersection is located) which have an impact on the calculated intersection may be obtained from the design of the in-cell capacitive touch screen, both the noise value $N_m$ corresponding to the current gray scale for the m-th impacting intersection in the non-touch state and the noise value $N_n$ corresponding to the current gray scale for the n-th impacting intersection in the non-touch state may be searched out in the table shown in FIG. 5.

It should be noted that the size of the picture block of the calculated intersection depends on the resolution, that is, the higher resolution leads to the smaller picture block. Therefore, the picture block may have a size of a pixel or combined pixels.

Figure 7:
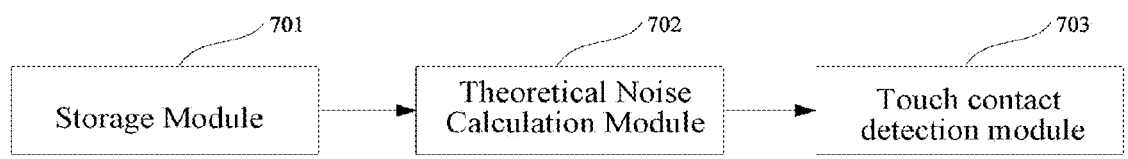
FIG. 7 is a schematic structural diagram showing the system for detecting the touch contact on the in-cell capacitive touch screen according to an embodiment of the present invention.

Accordingly, as shown in FIG. 7, the present invention also provides a system for detecting a touch contact on an in-cell capacitive touch screen. The system includes:

a storage module 701, which is configured to store noise values corresponding to different gray scales for each intersection of the in-cell capacitive touch screen in a non-touch state, and the table shown in FIG. 5 may be stored in the storage module;

a theoretical noise calculation module 702, which is configured to obtain a theoretical noise value for each intersection under the condition of the current picture based on the current picture displayed by the in-cell capacitive touch screen as well as the noise values corresponding to the different gray scales for each intersection in the non-touch state; and a touch contact detection module 703, which is configured to obtain a detected signal at each of the intersections of all rows and all columns of the in-cell capacitive touch screen, and to compensate the detected signal at each intersection with the theoretical noise value for each intersection under the condition of the current picture, so as to locate the position of the touch contact.

It should be noted that the noise values stored in the storage module 701 may be obtained by actually measuring or simulating the detected signals present when the in-cell capacitive touch screen displays the respective gray scales. Further, the noise values corresponding to the different gray scales for each intersection in the non-touch state are stored as a table by the storage module 701 (as shown in FIG. 5).

The theoretical noise calculation module 702 searches for the current picture displayed by the in-cell capacitive touch screen and the noise values corresponding to different gray scales for each intersection in the non-touch state, from the table shown in FIG. 5 as stored in the storage module 701.

Further, the step of obtaining the theoretical noise value for each intersection under the condition of the current picture by the theoretical noise calculation module 702 includes:

determining the current gray scale at each intersection based on the current picture displayed by the in-cell capacitive touch screen;

determining the noise value corresponding to a current gray scale for each intersection in a non-touch state based on the noise values corresponding to the different gray scales for each intersection in the non-touch state which are stored in the storage module; and calculating, based on the noise value corresponding to a current gray scale for an intersection in the non-touch state as well as noise values corresponding to current gray scale for other intersections in the non-touch state which are in the same row and/or column with said intersection, the theoretical noise value for each of the intersections of all rows and all columns of the in-cell capacitive touch screen under the condition of the current picture.

The present invention also provides an in-cell capacitive touch screen, which includes the above system for detecting the touch contact on the in-cell capacitive touch screen.

With the in-cell capacitive touch screen and the method and system for detecting the touch contact thereon as provided in the present invention, based on the different gray scale pictures displayed by the in-cell capacitive touch screen in a non-touch state and the distribution of the intersections of all rows and all columns of the in-cell capacitive touch screen, the noise values corresponding to the different gray scales for each intersection in a non-touch state are obtained; then, the theoretical noise value for each intersection under the condition of the current picture is obtained; next, for each of the intersections of all rows and all columns of the in-cell capacitive touch screen, the detected signal is compensated with the theoretical noise value in current picture, so as to locate the position of the touch contact. Therefore, with the in-cell capacitive touch screen and the method and system for detecting the touch contact thereon as provided in the present invention, it is possible to compensate in real time for noise interference caused by the liquid crystal capacitance in displaying pictures, and accurately detect the touch contact, thus reducing the impact of picture displaying on the touch.

Obviously, various modifications and variations can be made to the present invention by those skilled in the art without departing from the spirit and scope of the present invention. Thus, if the modifications and variations to the present invention fall in the scope of the appended claims and their equivalents of the present invention, the present invention is also intended to cover these modifications and variations.

What is claimed is:

1. A method for detecting a touch contact on an in-cell capacitive touch screen, the method comprising:

based on different gray scale pictures displayed by the in-cell capacitive touch screen in a non-touch state and a distribution of intersections of rows and columns of the in-cell capacitive touch screen, obtaining noise values corresponding to different gray scales for each of the intersections in the non-touch state;

based on a current picture displayed by the in-cell capacitive touch screen and the obtained noise values corresponding to the different gray scales for each intersection in the non-touch state, obtaining a theoretical noise value for each intersection under a condition of the current picture; and for each of the intersections of the rows and the columns of the in-cell capacitive touch screen, compensating a detected signal at each intersection with the theoretical noise value for the intersection under the condition of the current picture to locate a position of the touch contact;

wherein the theoretical noise value for each intersection is calculated by an equation:

$$N = N_0 + \Sigma_1^J N_m/(1+X_m/X) + \Sigma_1^K N_n/(1+Y_n/Y)$$

where N denotes the theoretical noise value corresponding to the current gray scale for the calculated intersection; No denotes the noise value corresponding to the current gray scale for the calculated intersection in the non-touch state; X denotes the length in the row direction of a picture block of the current gray scale displayed at the calculated intersection in the current display picture; Y denotes the length in the column direction of the picture block of the current gray scale displayed at the calculated intersection in the current display picture; J represents a total number of intersections which has an impact on and is in the same row with the calculated intersection; K represents a total number of intersections which has an impact on and is in the same column with the calculated intersection; $X_m$ denotes the distance between the calculated intersection and an m-th impacting intersection in the same row with the calculated intersection; $N_m$ denotes the noise value corresponding to the current gray scale for the m-th impacting intersection in the non-touch state; $Y_n$ denotes the distance between the calculated intersection and an n-th impacting intersection in the same column with the calculated intersection; and $N_n$ denotes the noise value corresponding to the current gray scale for the n-th impacting intersection in the non-touch state.

2. The method according to claim 1, wherein detected signals present when the in-cell capacitive touch screen displays respective gray scale pictures are measured or simulated for obtaining the noise values corresponding to the different gray scale pictures for each intersection in the non-touch state.

3. The method according to claim 1, wherein, in the non-touch state, the number of the different gray scale pictures displayed by the in-cell capacitive touch screen is 256, and each of the different gray scale pictures has a gray scale which is one of the gray scales in a range of 0-255; or the number of the different gray scale pictures displayed by the in-cell capacitive touch screen is 32, and each of the different gray scale pictures has a gray scale which is one of the gray scales in a range of 0-31; or the number of the different gray scale pictures displayed by the in-cell capacitive touch screen is 64, and each of the different gray scale pictures has a gray scale which is one of the gray scales in a range of 0-63; or the number of the different gray scale pictures displayed by the in-cell capacitive touch screen is 128, and each of the different gray scale pictures has a gray scale which is one of the gray scales in a range of 0-127; or the number of the different gray scale pictures displayed by the in-cell capacitive touch screen is 16, and each of the different gray scale pictures has a gray scale which is one of the gray scales in a range of 0-15.

4. The method according to claim 1, wherein the obtained noise values corresponding to the different gray scales for each intersection in the non-touch state form a table.

5. The method according to claim 1, wherein obtaining a theoretical noise value for each intersection under the condition of the current picture comprises:
determining a current gray scale at each intersection, based on the current picture displayed by the in-cell capacitive touch screen;
determining a noise value corresponding to the current gray scale for each intersection in the non-touch state based on the noise values corresponding to the different gray scales for each intersection in the non-touch state; and
calculating the theoretical noise value for each intersection under the condition of the current picture based on the noise value corresponding to the current gray scale for an intersection in the non-touch state and the noise values corresponding to the current gray scale for other intersections in the non-touch state which are in a same row and/or column with said intersection.

6. The method according to claim 1, wherein J and K each are no less than 2.

7. The method according to claim 1, wherein J and K are set based on the display resolution of the in-cell capacitive touch screen.

8. A system for detecting a touch contact on an in-cell capacitive touch screen, the system comprising:
a storage module configured to store noise values corresponding to different gray scales for each intersection of rows and columns of the in-cell capacitive touch screen in a non-touch state;
a theoretical noise calculation module configured to obtain a theoretical noise value for each intersection under a condition of a current picture based on the current picture displayed by the in-cell capacitive touch screen and the noise values corresponding to the different gray scales for each intersection in the non-touch state; and
a touch contact detection module configured to obtain a detected signal at each intersection and compensate the detected signal at each intersection with the theoretical noise value for each intersection under the condition of the current picture to locate a position of the touch contact;

wherein the theoretical noise value for each intersection is calculated by an equation:

$$N=N_0+\Sigma_1^J N_m/(1+X_m/X)+\Sigma_1^K N_n/(1+Y_n/Y)$$

where N denotes the theoretical noise value corresponding to the current gray scale for the calculated intersection; $N_0$ denotes the noise value corresponding to the current gray scale for the calculated intersection in the non-touch state; X denotes the length in the row direction of a picture block of the current gray scale displayed at the calculated intersection in the current display picture; Y denotes the length in the column direction of the picture block of the current gray scale displayed at the calculated intersection in the current display picture; J represents a total number of intersections which has an impact on and is in the same row with the calculated intersection; K represents a total number of intersections which has an impact on and is in the same column with the calculated intersection; $X_m$ denotes the distance between the calculated intersection and an m-th impacting intersection in the same row with the calculated intersection; $N_m$ denotes the noise value corresponding to the current gray scale for the m-th impacting intersection in the non-touch state; $Y_n$ denotes the distance between the calculated intersection and an n-th impacting intersection in the same column with the calculated intersection; and $N_m$ denotes the noise value corresponding to the current gray scale for the n-th impacting intersection in the non-touch state.

9. The system of claim 8, wherein, in the non-touch state, the number of the different gray scale pictures displayed by the in-cell capacitive touch screen is 256, and each of the different gray scale pictures has a gray scale which is one of the gray scales in a range of 0-255; or the number of the different gray scale pictures displayed by the in-cell capacitive touch screen is 32, and each of the different gray scale pictures has a gray scale which is one of the gray scales in a range of 0-31; or the number of the different gray scale pictures displayed by the in-cell capacitive touch screen is 64, and each of the different gray scale pictures has a gray scale which is one of the gray scales in a range of 0-63; or the number of the different gray scale pictures displayed by the in-cell capacitive touch screen is 128, and each of the different gray scale pictures has a gray scale which is one of the gray scales 0-127 in a range of; or the number of the different gray scale pictures displayed by the in-cell capacitive touch screen is 16, and each of the different gray scale pictures has a gray scale which is one of the gray scales in a range of 0-15.

10. The system according to claim 8, wherein the noise values corresponding to the different gray scales for each intersection in the non-touch state are stored as a table by the storage module.

11. The system according to claim 8, wherein obtaining the theoretical noise value for each intersection under the condition of the current picture by the theoretical noise calculation module comprises:
Determining a current gray scale at each intersection based on the current picture displayed by the in-cell capacitive touch screen;
determining a noise value corresponding to the current gray scale for each intersection in the non-touch state based on the noise values corresponding to the different gray scales for each intersection in the non-touch state which are stored in the storage module; and
calculating the theoretical noise value for each intersection under the condition of the current picture based on the noise value corresponding to a current gray scale for an intersection in the non-touch state and the noise values corresponding to the current gray scale for other intersections in the non-touch state which are in a same row and/or column with said intersection.

12. The system according to claim 8, wherein J and K each are no less than 2.

13. The system according to claim 8, wherein J and K are set based on the display resolution of the in-cell capacitive touch screen.

14. An in-cell capacitive touch screen including a system for detecting the touch contact on the in-cell capacitive touch screen, the system comprising:
- a storage module configured to store noise values corresponding to different gray scales for each intersection of rows and columns of the in-cell capacitive touch screen in a non-touch state;
- a theoretical noise calculation module configured to obtain a theoretical noise value for each intersection under a condition of a current picture based on the current picture displayed by the in-cell capacitive touch screen and the noise values corresponding to the different gray scales for each intersection in the non-touch state; and
- a touch contact detection module configured to obtain a detected signal at each intersection and compensate the detected signal at each intersection with the theoretical noise value for each intersection under the condition of the current picture to locate a position of the touch contact;

wherein the theoretical noise value for each intersection is calculated by an equation:

$$N = N_0 + \sum_1^J N_m/(1+X_m/X) + \sum_1^K N_n/(1+Y_n/Y)$$

where N denotes the theoretical noise value corresponding to the current gray scale for the calculated intersection; $N_0$ denotes the noise value corresponding to the current gray scale for the calculated intersection in the non-touch state; X denotes the length in the row direction of a picture block of the current gray scale displayed at the calculated intersection in the current display picture; Y denotes the length in the column direction of the picture block of the current gray scale displayed at the calculated intersection in the current display picture; J represents a total number of intersections which has an impact on and is in the same row with the calculated intersection; K represents a total number of intersections which has an impact on and is in the same column with the calculated intersection; $X_m$ denotes the distance between the calculated intersection and an m-th impacting intersection in the same row with the calculated intersection; $N_m$ denotes the noise value corresponding to the current gray scale for the m-th impacting intersection in the non-touch state; $Y_n$ denotes the distance between the calculated intersection and an n-th impacting intersection in the same column with the calculated intersection; and $N_n$ denotes the noise value corresponding to the current gray scale for the n-th impacting intersection in the non-touch state.

* * * * *